UNITED STATES PATENT OFFICE.

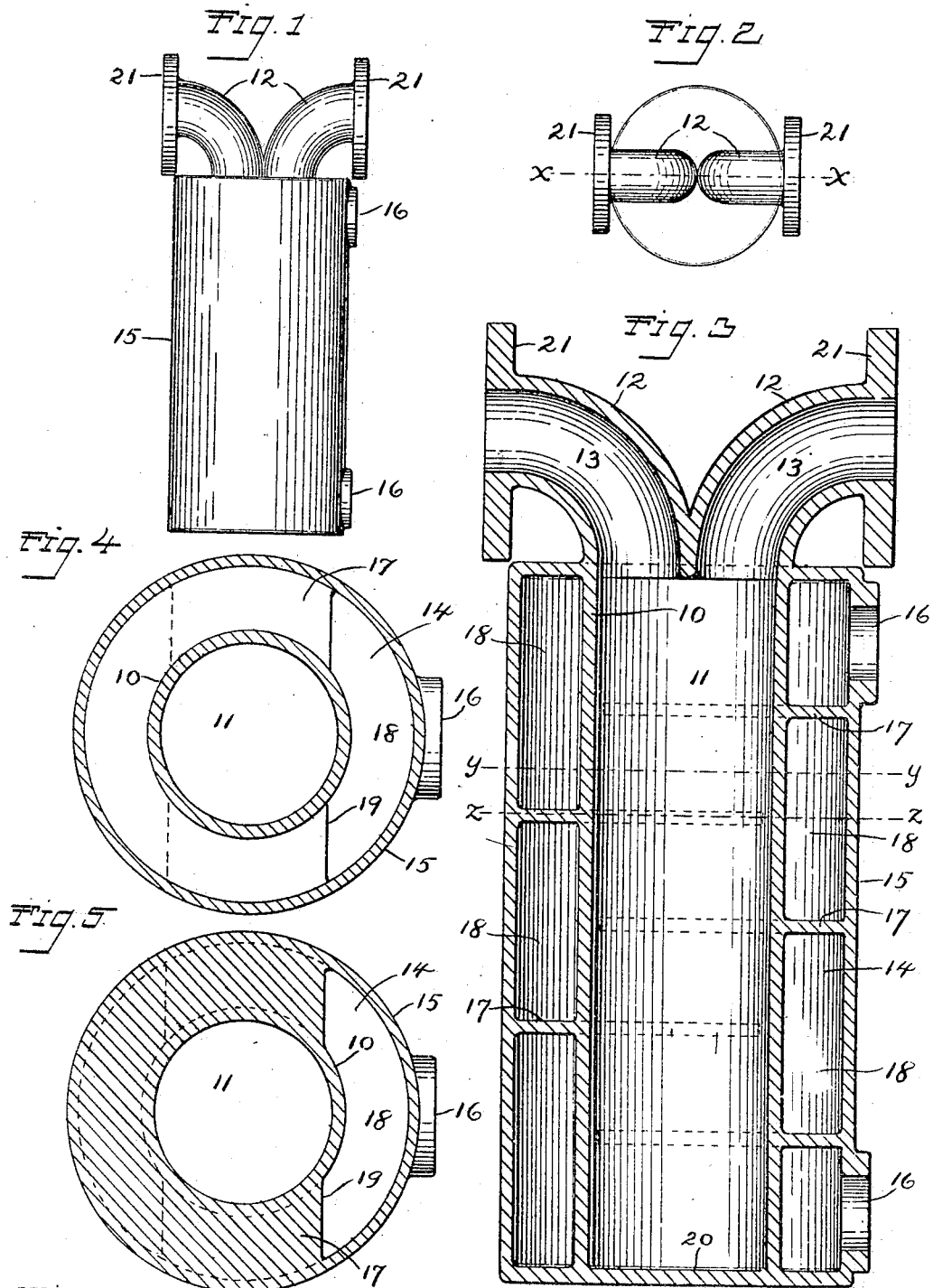

RUSSELL A. FRISBIE, OF MIDDLETOWN, CONNECTICUT.

GASEOUS-FUEL HEATER.

1,091,501.  Specification of Letters Patent.   Patented Mar. 31, 1914.

Application filed July 16, 1913.  Serial No. 779,389.

*To all whom it may concern:*

Be it known that I, RUSSELL A. FRISBIE, a citizen of the United States, residing at Middletown, in the county of Middlesex and State of Connecticut, have invented certain new and useful Improvements in Gaseous-Fuel Heaters, of which the following is a specification.

My invention relates to improvements in gaseous fuel heaters, and the object of my improvement is to produce a device for effective heating of the fuel supply for an internal combustion engine by means of the exhaust from the engine.

In the accompanying drawing: Figure 1 is a side elevation of my improved gaseous fuel heater. Fig. 2 is a plan view of the same. Fig. 3 is a sectional view on the line $x\ x$ of Fig. 2, and on an enlarged scale. Fig. 4 is a sectional view on the line $y\ y$ of Fig. 3. Fig. 5 is a sectional view on the line $z\ z$ of Fig. 3.

My gaseous fuel heater comprises an elongated double walled structure having an inner wall 10 extending the full length of the structure and inclosing an elongated open chamber 11 and provided at one end with a pair of connections 12 suitable for connection one with the exhaust port of a gaseous fuel engine and the other with the exhaust pipe, and having passages or ports 13 opening into the end of the chamber 11. The chamber 11 serves as an exhaust chamber.

Exterior to the exhaust chamber 11 is the fuel chamber 14, consisting of the space between the inner wall 10 and the outer wall 15, and extending the length of the exhaust chamber 11, and which is provided at the ends of the side wall with ports 16, one of which is connected to the carbureter or fuel supply and the other to the fuel inlet port of the engine. The fuel chamber 14 is closed at the ends and is provided with a plurality of bridges 17 of interrupted annular form and positioned in radial planes and positioned alternately on opposite sides of the axis. Each of the bridges 17 extends across the space between the inner wall 10 and the outer wall 15 for the greater part of the circumference thereof, leaving an open space or passage 18 between the free ends 19 of the bridges 17 and the opposed portions of the inner and outer walls 10 and 15. The bridges 17 serve to sub-divide the fuel chamber 14 into a circuitous passage connecting the fuel inlet and outlet ports 16 and which is composed of a plurality of cross-wise passages connected at the ends by the connection passages 18. Furthermore, the cross-wise passages are duplex along the body portion, being one on each side of the exhaust chamber 11, and at the lateral ends they are united by the connecting passages 18. Accordingly, in the travel from one fuel port 16 to the other by way of the fuel chamber 14 the direction of travel changes successively from the crosswise to the longitudinal and from the longitudinal to the cross-wise, and the cross-wise travel is in two parts by way of the duplex arrangement of the cross-wise passages and the longitudinal travel is in the form of a united column through the connecting passages 18. The result is that in the passage of the fuel as described there is such a whipping back and forth of the fuel, involving successive sub-division and reuniting of the flux and also abrupt changing of the course thereof that there will be effected the thorough commingling of the component parts of the fuel mixture so much desired for efficient operation and at the same time a thorough heating thereof, and what is quite important, a uniformity of heating of all the parts. Particularly, there will be avoided any possibility of the formation or existence of a central core to the fuel stream of relatively low temperature, such as does exist in cases where the direction of travel of the fuel mixture through the heater is along either straight passages of appreciable length or along passages having a uniform and moderate curvature.

The exhaust chamber 11 as described is an open chamber and the ports 13 of the connections 12 open into one end thereof, the other end 20 being closed. As shown the connections 12 are in the form of right angle bends, and are provided with flanges 21 at the ends for connecting to the piping system. The inner ends of the ports 13 or the ports proper at the junction of the connections 12 with the chamber 11 are directed longitudinally relatively to the chamber 11. Accordingly, a direct flow from one port 13 to the other is avoided and the effect of the impetus of the inward flow will be to drive the exhaust gases longitudinally along the chamber 11 to the bottom 20 and along one side of the said chamber 11 and the return flow will be along the other side to the outlet port 13. That is, a definite direction of flow will be maintained in the chamber 11 notwithstanding the fact that it is entirely open and because of the directive effect of the connections 12 and the ports 13 at the ends thereof. Accordingly, my gaseous fuel heater serves to deliver the exhaust gases in an efficient manner to the exhaust chamber and the transfer of heat therefrom to the fuel mixture is effected in a manner to produce a thorough and uniform heating thereof.

I claim as my invention:—

1. A gaseous fuel heater comprising a double walled generally cylindrical structure having an axial elongated exhaust chamber and a fuel chamber exterior thereto and having an inlet and an outlet port, the said exhaust chamber being an open chamber and having an inlet and an outlet at one end, and the said inlet and outlet connections at the junction thereof with the said chamber being directed in parallelism with the axis of the said chamber so as to direct the fuel flow along the body portion of the said chamber in parallelism with the axis, and along one side of the said chamber and in one direction from the inlet port and along the other side and in the reverse direction toward the outlet port.

2. A gaseous fuel heater comprising an elongated and generally cylindrical double walled structure having an inner axial exhaust chamber provided with inlet and outlet connections, and an outer fuel chamber inclosing the said inner axial chamber and having an inlet port at one end and an outlet port at the other end, and a plurality of interrupted annular bridges in the said fuel chamber and positioned in a radial plane so as to bridge the space between the walls of the said inner chamber and outer chamber for the greater part of the circumference thereof and the said bridges being alternately positioned on opposite sides of the axis so as to provide a circuitous and partially duplex passage in the said fuel chamber between the said inlet and outlet ports.

RUSSELL A. FRISBIE

Witnesses:
  M. BURKE,
  A. A. CONROY.